(No Model.) 2 Sheets—Sheet 1.
D. THOM.
RIDING PLOW.
No. 502,106. Patented July 25, 1893.
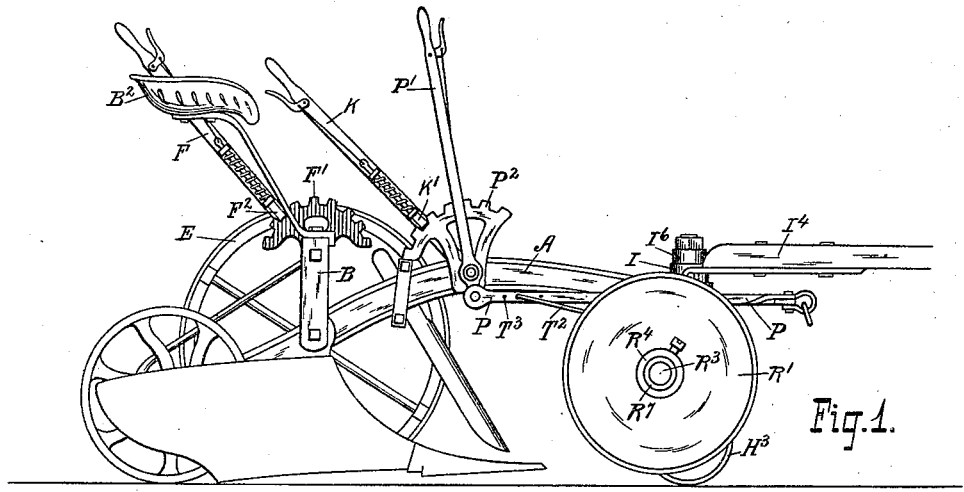
Fig. 1.
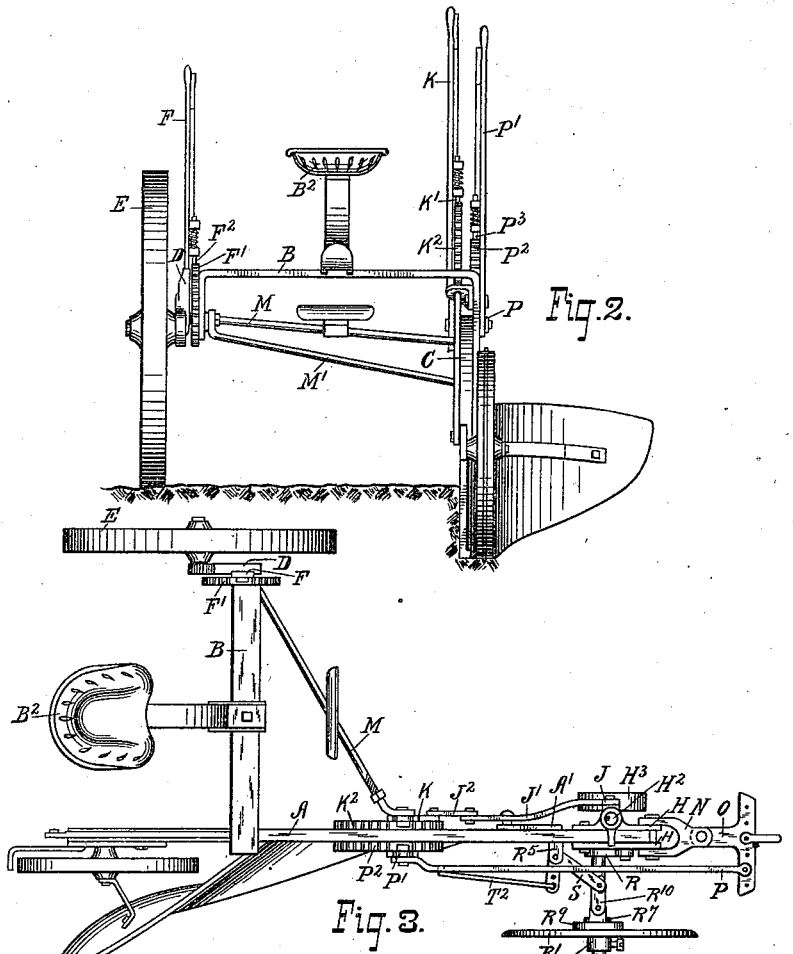
Fig. 2.
Fig. 3.
Witnesses
A. Edmunds
Jas. E. Edmunds
Inventor
David Thom
By P. J. Edmunds
Att'y (No Model.) 2 Sheets—Sheet 2.

D. THOM.
RIDING PLOW.

No. 502,106. Patented July 25, 1893.

Witnesses
A. Edmunds
Jas. E. Edmunds

Inventor
David Thom
By P. J. Edmunds
Att'y

UNITED STATES PATENT OFFICE.

DAVID THOM, OF WATFORD, CANADA.

RIDING-PLOW.

SPECIFICATION forming part of Letters Patent No. 502,106, dated July 25, 1893.

Application filed March 20, 1891. Serial No. 385,764. (No model.) Patented in Canada January 28, 1890, No. 33,531.

*To all whom it may concern:*

Be it known that I, DAVID THOM, a subject of the Queen of Great Britain, and a resident of Watford, in the Province of Ontario, Canada, have invented certain new and useful Improvements in Riding-Plows, (for which I have obtained Canadian Letters Patent No. 33,531, issued January 28, 1890,) of which the following specification, taken in connection with the accompanying drawings, forms a full, clear, and exact description.

This invention relates to improvements on an implement supported on wheels, and carrying a seat for the driver, and which implement, is for the purpose of turning a furrow, the object being to stir the soil to make a bed for seed, &c.

This invention consists of a clevis, in combination with a coupling, one having a pivotal lateral, and the other, a pivotal vertical movement, and means for adjusting and holding said clevis, at the position to which it may be adjusted; also of the combination with a clevis, of a press or gage wheel adjusted simultaneously and together with said clevis, and means for adjusting and holding said press or gage-wheel, and clevis for the purpose of regulating the width of the furrow to be cut; also of a slotted or grooved post, having a depth or gage-wheel attached thereto, and a tongue casting, having a fin or feather fitted to the slot in said post to cause both to turn together by the tongue movement, yet permitting the wheel post to be raised or lowered, without raising or lowering the tongue casting.

It also consists of the improved construction and combination of parts of the same, as will be hereinafter first fully set forth and described, and then pointed out in the claims.

Reference is had to the accompanying drawings, wherein—

Figure 4:
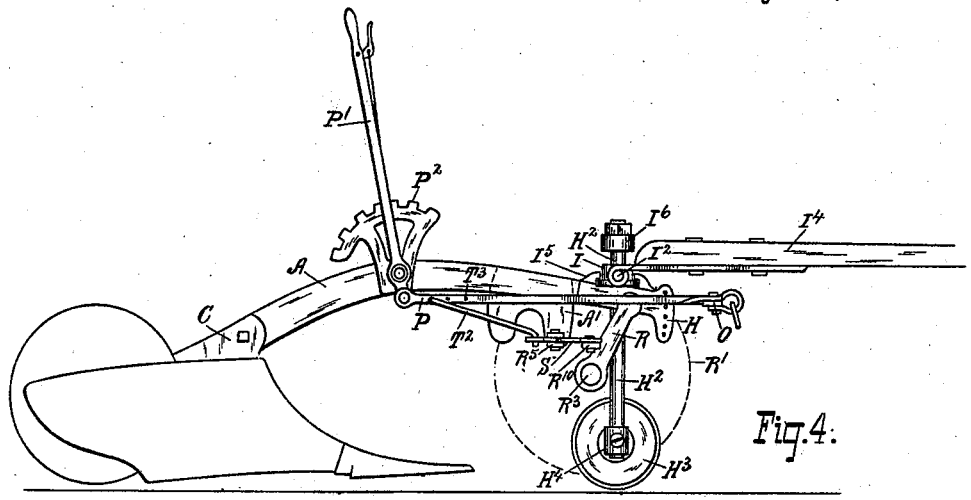
Figure 5:
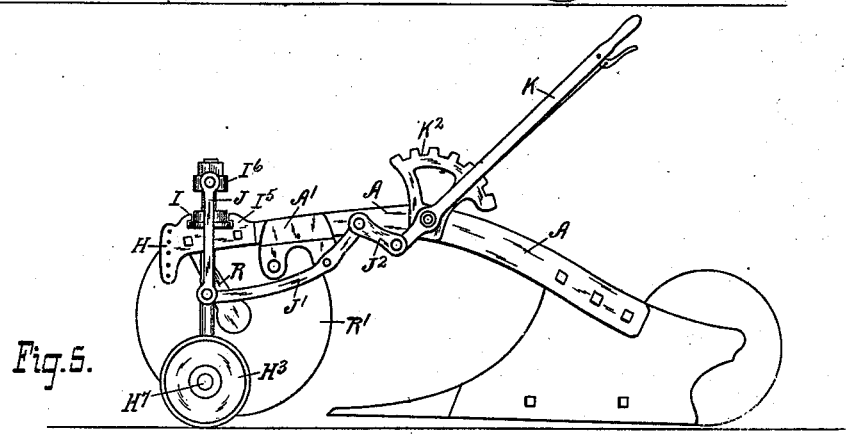
Figure 6:
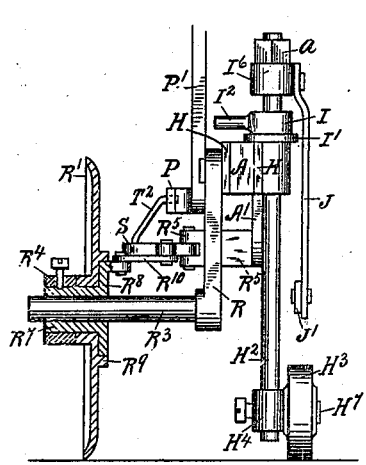
Figure 7:
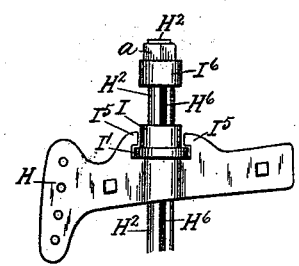
Figure 8:
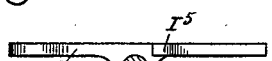
Figure 9:

Figure 1. is a side elevation of an implement, embodying these improvements, showing the plow raised out of the ground. Fig. 2. is a rear end view of Fig. 1. showing the plow in the ground. Fig. 3. is a plan view of Fig. 1. with the tongue removed. Fig. 4. is a detail side elevation of the front portion of Fig. 1. In this view, the gage or press wheel is removed, but its position is shown by dotted line. Fig. 5. is another detail view of the front portion of Fig. 1. looking at it from the opposite side to that shown in Fig. 4. Fig. 6. is an enlarged detail front end view of the plow beam and attachments partly in section. Fig. 7. is an enlarged detail side elevation of the upper portion of the slotted or grooved post and connections. Fig. 8. is a plan view of the grooved or slotted post and support. Fig. 9. is a plan view of the tongue casting.

A, designates the plow beam; B, a supplemental frame; and C, the plow-head, to which the plow-beam, A, and one side of the supplemental frame B, are bolted or otherwise rigidly secured.

$B^2$, is a seat for the driver which is secured to the supplemental frame, B.

F, designates a lever, pivoted on the land side of the frame, B. This lever, F, is provided with a spring actuated dog, $F^2$, and an arm, D, which carries the land wheel, E; and, F', is a toothed segment, rigidly secured to the frame, B, with which segment, the spring actuated dog, $F^2$, engages, to hold the lever, F, as well as the land wheel at the position to which it is, or may be adjusted, to bring and hold the frame, B, in a horizontal position when the plow is in or out of the ground.

M, designates an adjustable brace, secured to, and extending from the beam, A, across to the supplemental frame, B; and, M', is a brace, extending across the supplemental frame, B, which braces the latter to the plow head, C, for the purpose of retaining said frame, B, in proper position in relation to the beam, A.

N, designates a pivotal coupling, between the clevis, O, and the jaws, H, or the beam, A, or other suitable support.

O, is a clevis or bridle, which has a pivotal lateral movement and the coupling, N, a pivotal vertical movement, or this may be reversed, and the former have a pivotal vertical, and the latter a pivotal lateral movement.

P, is a connecting rod or bar between the lever, P', and the cross head of the clevis, O.

P', designates a lever, fulcrumed on the plow beam, A, or other suitable support, and provided with a spring actuated dog, $P^3$.

$P^2$, is a toothed segment, rigidly secured to the plow beam, A, or other suitable support, with which the dog, $P^3$, engages, to hold the lever, P', and connections at the position to which they are or may be adjusted. By simply adjusting the lever, P', the clevis, O, (having a lateral pivotal movement, and connected therewith,) is readily pivotally adjusted to either side, and by pivotally adjusting the clevis to the land side, a narrower furrow is cut, and by pivotally adjusting the clevis toward the furrow side, a wider furrow is cut, as the draft on the plow is adjusted, thereby to either side of the beam, A.

R, designates a bracket or arm or other suitable support, suspended from, and rigidly secured to the plow beam, A, or other suitable support, and rigidly secured to or formed integral with this bracket, R, is an axle or extended stud pin, $R^3$. $R^7$, is a sleeve on this axle, $R^3$, and said sleeve, $R^7$, is provided with a flange, $R^8$.

R', is a gage or press wheel revolving perfectly free and securely held on this sleeve, $R^7$, between the flange, $R^8$, and the collar, $R^4$, the latter being held on the sleeve, $R^7$, by a set screw or other suitable securing device; and $R^9$ is a sand band or flange, on the press or gage wheel, R', to prevent the sand or dirt from getting in between the flange, $R^8$, and said wheel, R'.

$R^5$ designates an arm, or other suitable support, pivotally secured to a hanger, A', suspended from the beam, A, or other suitable support.

S, is a bell crank lever pivoted on this arm, $R^5$, as shown in Fig. 3.

$T^2$ is a connecting rod, which connects the bell crank lever, S, and the connecting rod or bar, P, as shown in Figs. 3, and, 4, and $R^{10}$, is a coupling link which pivotally secures the bell crank lever, S, to the sleeve, $R^7$, as shown in Figs. 3, and 6. By operating this connecting bar, P, to adjust the clevis, O, as described, for the purpose of cutting a narrower or wider furrow; at the same time, the bell crank lever, S, and its connections with the bar, P, adjusts the sleeve, $R^7$, as well as the gage or press wheel, R', held thereon, laterally, simultaneously, and together with the clevis, O, for a similar purpose, and for a proportionate distance. The gage or press wheel, R', may be further adjusted, and independent of the movement of the connecting bar, P, by securing one end of the brace rod, $T^2$, to said bar, at a point to or from the lever, P', by projecting the end of the brace rod, through perforations, $T^3$, in the connecting bar, P, or otherwise, as found most suitable or convenient, or the same result may be attained, by attaching the brace rod, $T^2$, to the bell crank, S, at a point, to or from its pivot.

As shown in Fig. 8, the jaw, H, is formed with a socket, H', in which the post, $H^2$, is guided and held, and in which the post turns perfectly free, or this socket may be formed in the plow beam, or in any attachment secured to or formed integral with said jaw or plow beam, or other suitable support.

$H^2$ is a post, to the lower end of which the depth or gage wheel, $H^3$, is secured.

$H^4$, is a collar, rigidly secured to the axle, $H^7$, of the depth or gage wheel, $H^3$, in which collar, $H^4$, the post, $H^2$, is firmly secured, by a set screw or other suitable securing device, so that this depth or gage wheel, $H^3$, may be adjusted at any angle to the plow beam by loosening the set screw, adjusting the gage wheel, $H^3$, as required, then holding said wheel, $H^3$, in this position by tightening the set screw again.

I, is a tongue casting, provided with a flange, I', an arm or stud pin, $I^2$, and a feather or key, $I^3$. Through this tongue casting, I, the post, $H^2$, extends.

On the stud pin, $I^2$, the tongue, $I^4$, is pivotally secured to move perfectly free in a pivotal vertical direction.

$H^6$, is a groove, formed lengthwise in the post, $H^2$, to which the feather or key, $I^3$, is fitted; and as the post, $H^2$, turns perfectly free in the socket, H', when operated by the tongue, being connected therewith by the tongue casting, as just described, the tongue, $I^4$, tongue casting, I, post, $H^2$, and gage wheel, $H^3$, move together and perfectly free in a pivotal lateral direction. This recess or groove, $H^6$, in the post, $H^2$, and the projection or feather key, $I^3$, in the tongue casting, I, may be reversed, and the recess formed in the tongue casting, and the projection on the post. However, this is a common construction to permit one object to move lengthwise independent of the other, at the same time prevent one from turning independent of the other, and I do not wish to confine myself to this construction, as any well known means of attaining this result may be used in preference to the above, but at present, this construction is considered preferable; and the jaw, H, or other suitable adjacent support is provided with one or more overhanging flanges, $I^5$, which forms a recess to which the flange, I', is fitted. The recess formed by this flange, $I^5$, permits the tongue casting, I, to turn laterally with the post, $H^2$, but prevents it from rising with the post, so that the tongue, $I^4$, being secured to this tongue casting, is not raised with the post, although they both turn laterally together; and again while this flange, I', on the tongue casting, I, is considered preferable, this flange, I', may be dispensed with, and the overhanging flange, $I^5$, project over the body or main portion of the tongue casting, I, and attain the same result viz:—to prevent the tongue casting, I, from rising with the post, $H^2$, but at the same time, will not interfere with its turning with said post.

$I^6$, is a sleeve or ring collar which turns perfectly free on the post, $H^2$, and which is prevented from becoming detached therefrom by a nut, a, screwed on the upper end of the post, $H^2$. This nut also prevents the post, $H^2$, from falling out of the tongue casting, I, and socket, H'.

J, is a hanger pivotally secured to the collar, $I^6$, and, J', is a lever, fulcrumed on the support, A', the ends of which lever, J', are pivotally secured directly to the hanger, J, and to the lever, K, by the coupling link, J². The lever, K, is fulcrumed on the beam, A, or other suitable support, and is provided with a spring actuated dog, K', which engages with the teeth of the toothed segment, K², to hold said lever at the position to which it is or may be adjusted, and by adjusting the lever, K, to, or from the driver's seat, the post, H², as well as the gage wheel, H³, secured thereto, through the connections described, is raised or lowered, and thereby adjusted to gage or regulate the depth that the plow enters the ground, and of the furrow turned, and at the same time, do this independent of the tongue casting, or of the device which secures the tongue to the machine.

Having thus described my invention, I claim—

1. The combination of a clevis, O, and a press or gage wheel, R', adjusted simultaneously and together with said clevis, and means for adjusting and holding said clevis and press or gage wheel, as, and for the purpose set forth.

2. The combination of a clevis, O, having a pivotal lateral movement, and a press or gage wheel, R', having a lateral movement, as well as a revolving motion, and supported on the axle or extended stud pin, R³, the bell crank lever, S, and connecting rod, T², connecting said press or gage wheel, R', with the connecting rod, P, and the latter formed with perforations, T³, and connecting the clevis, O, with the lever, P', provided with a spring actuated dog, which engages with the toothed segment, P², substantially as shown and described, and for the purpose specified.

3. The combination of the post, H², with the tongue casting, I, one having a fin or projection, I³, and the other, a groove or recess, H⁶, to which said projection is fitted, to cause them to both turn together, and the same proportionate distance, at the same time, permit the gage wheel and post to be raised and lowered without raising or lowering said tongue casting, a gage wheel, H³, attached to the lower end of said post, and means for raising or lowering said gage wheel and post, as, and for the purpose set forth.

4. A tongue casting, I, and overhanging flange, I⁵, in combination with the jaw, H, in which a socket, H', is formed, the post, H², gage wheel, H³, and means for adjusting and holding said devices at any position, to which they may be adjusted, substantially as, and for the purpose set forth.

In testimony whereof I affix my signature in the presence of the two undersigned witnesses.

DAVID THOM.

Witnesses:
JNO. T. FULLER,
WM. McCLURE.